United States Patent [19]

Mermelstein

[11] Patent Number: 5,233,403
[45] Date of Patent: Aug. 3, 1993

[54] HETERODYNE ARRAY FOR MEASUREMENT OF TARGET VELOCITY

[75] Inventor: Marc D. Mermelstein, Chevy Chase, Md.

[73] Assignee: The United States of America as represented by the Secretary of the Navy, Washington, D.C.

[21] Appl. No.: 906,649

[22] Filed: Jun. 30, 1992

[51] Int. Cl.$^5$ .............................................. G01P 3/36
[52] U.S. Cl. .................................................. 356/28.5
[58] Field of Search .................... 356/28.5, 28, 318; 364/923.4

[56] References Cited

U.S. PATENT DOCUMENTS

| | | | |
|---|---|---|---|
| 3,419,330 | 12/1968 | Schneider et al. | 356/106 |
| 4,506,979 | 3/1985 | Rogers | 356/28.5 |
| 4,925,297 | 5/1990 | Brown | 356/28.5 |
| 5,148,229 | 9/1992 | Wisall | 356/28 |

OTHER PUBLICATIONS

T. J. Kane et al., "Coherent Laser Radar At 1.06um Using Nd:YAG Lasers," Optics Letters, 12(4), pp. 239-241, (1987).
M. J. Kavaya et al., "Remote Wind Profiling With A Solid-State Nd:YAG Coherent Lidar System," Optics Letters, 14(15), pp. 776-778, (1989).
A. L. Huston et al., "Frequency-Offset, Solid-State Laser Coherent Doppler Velocity Measurements of High-Speed Targets," Optics Letters 15(10), pp. 570-572, (1990).

Primary Examiner—Mark Hellner
Attorney, Agent, or Firm—Thomas E. McDonnell; Daniel Kalish

[57] ABSTRACT

A system for determining the angular velocity of a mobile target relative to a station. The system develops first and second reference beams and a beam to the target to enable the target to generate first and second signals. Optical devices, preferably fiberoptical devices, responsive to the first and second reference beams and to the first and second signals respectively received from the target at discrete first and second positions on the station, respectively produce first and second interference pattern signals. Each of said received signals has a Doppler shift as a function of the movement of the target. An electrical processing circuit then processes the interference pattern signals to develop a signal indicative of the target's angular velocity.

12 Claims, 8 Drawing Sheets

HETERODYNE ARRAY FOR MEASUREMENT OF TARGET VELOCITY

BACKGROUND OF THE INVENTION

The present invention relates to devices for measuring the velocity of a mobile target and, more particularly, to a system for measuring the angular velocity of a mobile target.

Doppler velocimeters rely on the phenomenon of Doppler shift to measure the radial velocity of a mobile target. A monochromatic transmitter beam is directed from the base station to the target. Part of this beam is scattered by the target in the direction of the base station. Because of the Doppler effect, the scattered signal received at the base station has its frequency shifted by an amount proportional to the target's radial velocity, which is that component of the velocity that is parallel to the displacement from the station to the target. The scattered signal is heterodyned (mixed) with the transmitted signal to produce a beat note whose frequency is the Doppler shift frequency. The radial velocity is then readily determined from the frequency of that beat note.

When tracking a mobile target, it is often important to know not just the target's radial velocity but also its angular or transverse velocity. The system discussed in the preceding paragraph merely measures the target's radial velocity and not this angular or transverse velocity component.

The shorter the wavelength of the transmitted beam, the greater the resolution and accuracy of the Doppler velocimeter. Therefore, optical techniques are preferable to conventional radio wave techniques. However, bulk optical systems must be maintained in critical alignment and they take up a great deal of space and weight.

SUMMARY OF THE INVENTION

It is an object of the present invention to measure the angular velocity of a mobile target.

Another object of the invention is to measure the angular velocity of a mobile target using optical techniques.

A further object of the invention is to measure the angular velocity of a mobile target using fiberoptical processing techniques.

These and other objects of the invention are achieved by a system for determining the angular velocity of a mobile target relative to a station. The system develops first and second reference beams and a beam to the target to enable the target to generate first and second signals. Optical devices, preferably fiberoptical devices, responsive to the first and second reference beams and to the first and second signals respectively received from the target at discrete first and second positions on the station, respectively produce first and second interference pattern signals. Each of said received signals has a Doppler shift as a function of the movement of the target. An electrical processing circuit then processes the interference pattern signals to develop a signal indicative of the target's angular velocity.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views, and wherein.

DETAILED DESCRIPTION OF THE PREFERRED EMBODIMENT

Figure 1:
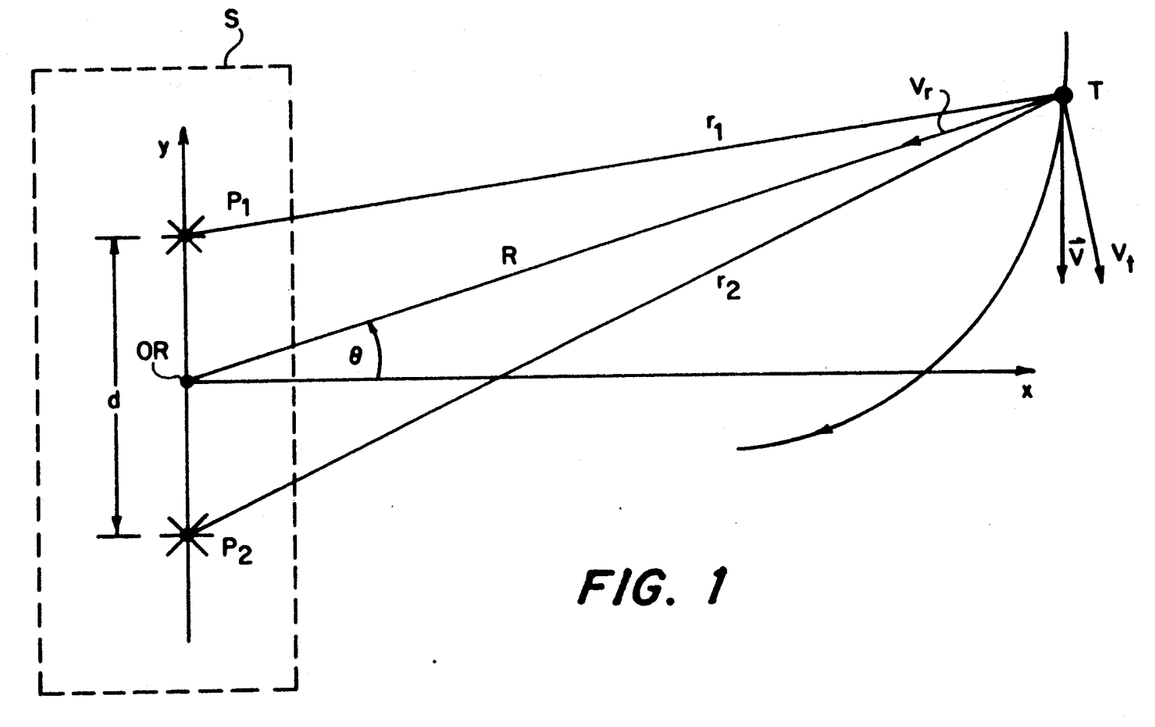
FIG. 1 is a schematic diagram of the operation of the invention illustrating the phase sensitive measurement technique for determining radial and angular velocities of the target.

Referring now to FIG. 1 of the drawings, the principles of operation of the invention will now be explained. FIG. 1 shows a mobile target T and discrete positions $P_1$ and $P_2$ at a base station S. The target T moves with instantaneous velocity $\vec{v}$ with respect to the station S along a trajectory as shown. A cartesian coordinate system of the station's frame of reference is defined with origin OR at the midpoint between the positions $P_1$ and $P_2$, with the y-axis in the direction from the position $P_2$ to the position $P_1$, and with the x-y plane defined by the position $P_1$, the position $P_2$, and the target T. The positions $P_1$ and $P_2$ are a distance d apart, where $d > 0$. The target T is at range R from the origin OR with angular position $\theta$ with respect to the x-axis in the x-y plane.

The velocity vector $\vec{v}$ is resolved into radial velocity $v_r$, and transverse velocity $v_t$ components in the x-y plane defined above. For signals $S_1$ and $S_2$ (see FIG. 2) emanating from the target T and respectively received at the positions $P_1$ and $P_2$, each of signals $S_1$ and $S_2$ having wavelength $\lambda_0$, $\Phi_1$ and $\Phi_2$ respectively will represent the phases of signals $S_1$ and $S_2$. Then $\Phi_1 = k_0 \cdot r_1$ and $\Phi_2 = k_0 \cdot r_2$, where $k_0 = 2\pi/\lambda_0$ and $r_1$ and $r_2$ are the distances between the positions $P_1$ and $P_2$ respectively and the target T.

For $d < R$, the phases are given by the expressions:

$$\Phi_1 \approx k_0[R - (d/2)\cdot\sin\theta] \qquad (1a)$$

$$\Phi_2 \approx k_0[R + (d/2)\cdot\sin\theta]. \qquad (1b)$$

In equations (1a) and (1b), the phases $\Phi_1$ and $\Phi_2$ are each dependent on both the range R and angular position $\theta$. Equations (1a) and (1b) may be added and subtracted to separate the dependence on the range R and angular position $\theta$ as follows:

$$\Phi_+ \approx \Phi_2 + \Phi_1 = 2k_0 \cdot R \qquad (2a)$$

$$\Phi_- \approx \Phi_2 - \Phi_1 = k_0 \cdot d \cdot \sin\theta. \qquad (2b)$$

Taking the time derivatives of both sides of equations (2a) and (2b) yields the following relations:

$$\frac{d\Phi_+}{dt} = \frac{d\Phi_2}{dt} + \frac{d\Phi_1}{dt} = 2k_0 \cdot v_r \quad (3a)$$

$$\frac{d\Phi_-}{dt} = \frac{d\Phi_2}{dt} - \frac{d\Phi_1}{dt} = k_0 \cdot d \cdot \frac{d\Phi}{dt} \approx k_0 \cdot d \cdot \frac{v_t}{R} \quad (3b)$$

for $\theta < 1$, since $v_r = dR/dt$ and $d\theta/dt \approx d(\sin \theta)/dt = v_t/R$. The time rate of change of a signal's phase is the angular frequency and so the expressions $d(\Phi_1)/dt$ and $d(\Phi_2)/dt$ in equations (3a) and (3b) represent the angular frequency shifts of received signals $S_1$ and $S_2$.

Equation (3a) means that the sum of the angular frequency shifts $d\Phi_1/dt$ and $d\Phi_2/dt$ of the received signals $S_1$ and $S_2$ is proportional to the radial velocity $v_r$. Equation (3b) means that the difference between the angular frequency shifts of received signals $S_1$ and $S_2$ is proportional to the angular velocity $(d\theta/dt)$ and is also proportional to the transverse velocity $v_t$.

Expressed in terms of frequencies, equations (3a) and (3b) become:

$$f_2 + f_1 = (1/2\pi) \cdot d(\Phi_+)/dt = 2 \cdot v_r/\lambda_0 \quad (4a)$$

$$f_2 - f_1 = (1/2\pi) \cdot d(\Phi_-)/dt = d \cdot v_t/(R \cdot \lambda_0) \quad (4b)$$

where $f_1$ and $f_2$ respectively are the frequencies of the received signals $S_1$ and $S_2$.

Equation (4a) means that the sum of the frequencies $\Phi_1$ and $\Phi_2$ of the received signals $S_1$ and $S_2$ is proportional to the radial velocity $v_r$. Equation (4b) means that the difference between the frequencies of received signals $S_1$ and $S_2$ is proportional to the angular velocity $(d\theta/dt)$ and is also proportional to the transverse velocity $v_t$.

Signals $S_1$ and $S_2$ emanating from the target T are, for example, reflections of a beam $B_1$ (see FIG. 2) transmitted from the origin OR and having wavelength $\lambda_0$ in the frame of reference of the station S. Upon receipt at target T, beam $B_1$ will have a phase shift, and so signals $S_1$ and $S_2$ emanating from the target T and received at positions $P_1$ and $P_2$ will have a phase shift different from that expressed in equations (1a) and (1b). If the target T is a perfect reflector, then equations (1a) and (1b) are modified as follows:

$$\Phi_1 \approx k_0 \cdot R + k_0 [R - (d/2) \cdot \sin \theta] \quad (1a')$$

$$\Phi_2 \approx k_0 \cdot R + k_0 R + (d/2) \sin \theta]. \quad (1b')$$

Adding and subtracting equations (1a') and (1b') yields:

$$\Phi_+ = 4k_0 \cdot R \quad (2a')$$

$$\Phi_- = k_0 \cdot d \cdot \sin \theta. \quad (2b')$$

It can be seen that equation (2b) continues to hold in this situation. This is so because any changes in phase $\Phi_1$ caused by the propagation of beam $B_1$ from the origin OR to the target T applies equally to changes in phase $\Phi_2$. Because equation (2b) applies to this situation, so do equations (3b) and (4b), which are derived from equation (2b).

However, equation (2a') replaces equation (2a) in this situation. Taking the time derivative of it yields:

$$\frac{d\Phi_+}{dt} = \frac{d\Phi_2}{dt} + \frac{d\Phi_1}{dt} = 4k_0 \cdot v_r. \quad (3a')$$

This equation means that the sum of the angular frequencies $\Phi_1$ and $\Phi_2$ of the received signals $S_1$ and $S_2$ is proportional to the radial velocity $v_r$, as in equation (3a), but with double the proportionality factor.

Expressed in terms of frequencies, equation (3a') becomes:

$$f_2 + f_1 = 4 \cdot v_r / \lambda_0. \quad (4a')$$

This equation means that the sum of the frequencies $\Phi_1$ and $\Phi_2$ of the received signals $S_1$ and $S_2$ is proportional to the radial velocity $v_r$, just as in equation (4a), but with double the proportionality factor.

Equations (1a)-(4b) might have to be modified to describe other situations within the scope of the inventions, such as reflection by a target T which is not a perfect reflector, and such as reception and retransmission by the target T of beam $B_1$ and signals $S_1$ and $S_2$, respectively.

As an example of applying the above equations to this invention, a ground station S could track a satellite target T at range $R = 1.0 \times 10^6$ meters (m) by having positions $P_1$ and $P_2$ spaced $d = 5.0$ m apart. If the radial and tangential velocities $v_r$ and $v_t$ of the target T are each $1.0 \times 10^3$ m/second (s) and the wavelength of transmitted beam is $\lambda_0 = 1.06$ micrometers ($\mu$m), then $f_2 + f_1 = 3.8$ gigahertz (GHz) and $f_2 - f_1 = 4.7$ kilohertz (kHz).

Figure 2:
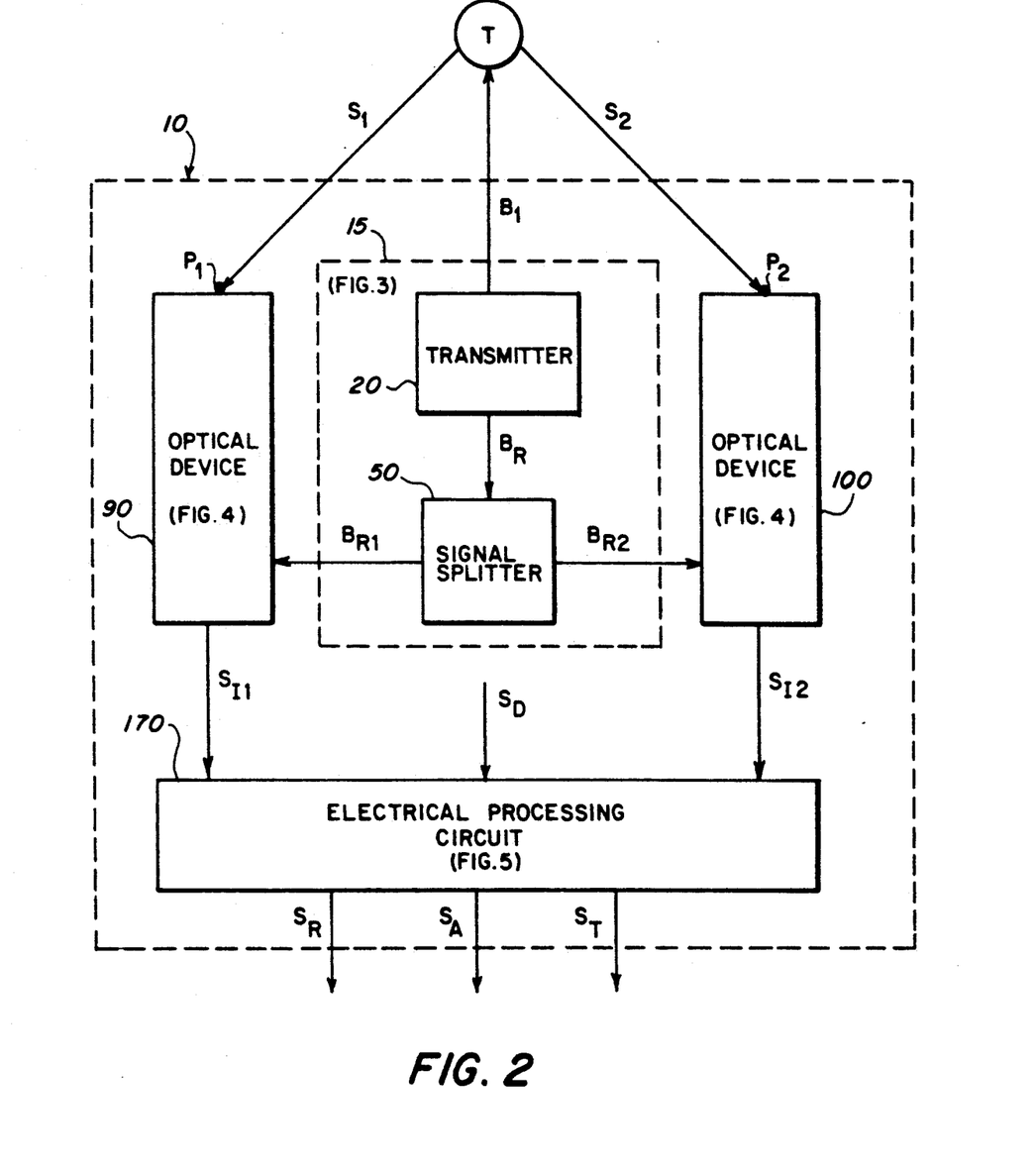
FIG. 2 is a schematic block diagram of a preferred embodiment of the invention.

Referring now to FIG. 2, a schematic block diagram of a preferred embodiment of the invention is shown. More specifically, FIG. 2 shows a system 10 for determining the velocity of a mobile target T relative to the station S.

A beam producer 15 develops reference beam $B_{R1}$ and $B_{R2}$, and transmits a beam $B_1$ to the target T to enable the target T to develop signals $S_1$ and $S_2$. The beam producer 15 need not be in a fixed position with respect to station S. Beam producer 15 preferably comprises a transmitter 20 and a signal splitter 50.

The transmitter 20 develops an internal reference beam $B_R$ and transmits beam $B_1$ to the target. Although not shown, it is understood that transmitter 20 typically includes a transmitting element, such as a radiating source, for transmitting beam $B_1$ from the transmitter 20 to the target T.

Figure 3:
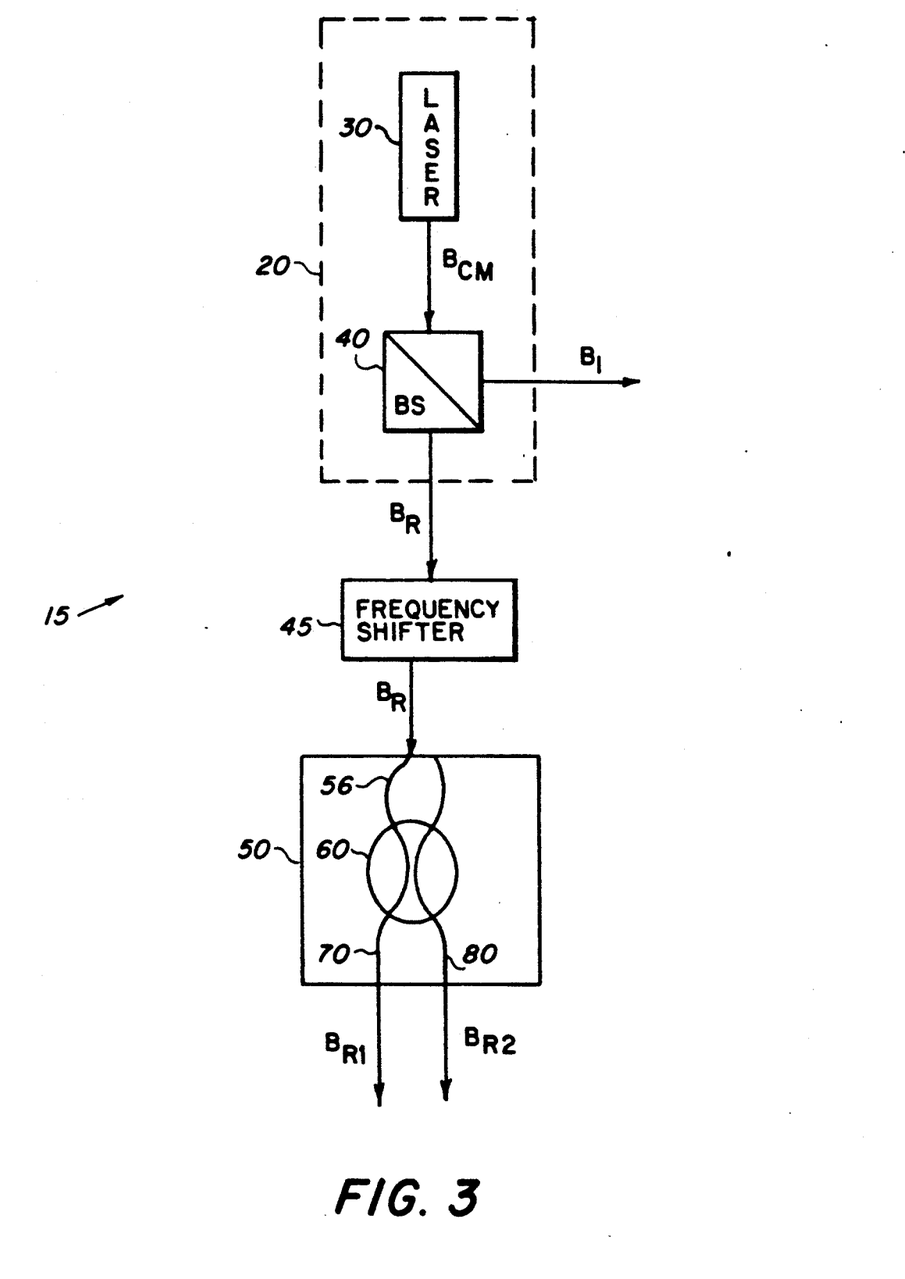
FIG. 3 is a schematic block diagram of an exemplary beam producer 15 of the embodiment of FIG. 2.

The transmitter 20 preferably develops highly coherent, substantially monochromatic, optical beams. Referring briefly to FIG. 3, an exemplary transmitter 20 is illustrated. As shown in FIG. 3, a continuous wave (cw) laser 30 produces a coherent, monochromatic beam $B_C$ beam $B_R$ which is split by a beam splitter 40 into the reference beam $B_R$ and the beam $B_1$.

Referring further to FIG. 3, a frequency shifter 45 can be used to shift the frequency of the reference beam $B_R$ by a preselected amount. For example, the frequency shifter 45 could be a Bragg cell. The frequency shifter 45 is optional and is not absolutely required for operation of the system 10 shown in FIG. 2.

Referring back to FIG. 2, a signal splitter 50 is responsive to the reference signal $B_R$ for producing reference beams $B_{R1}$ and $B_{R2}$, which are preferably highly coherent, substantially monochromatic, optical beams. Referring briefly to FIG. 3, an exemplary signal splitter 50 is illustrated. In response to the application of reference beam $B_R$ to an input arm 56 of a fiber optic coupler 60, the coupler 60 produces reference beams $B_{R1}$ and $B_{R2}$ at its output arms 70 and 80.

The invention could also be practiced by using any other means of producing reference beams $B_{R1}$ and $B_{R2}$ and beam $B_1$ as long as transmission of the beam $B_1$ enables the target T to generate signals $S_1$ and $S_2$.

For example, target T could be a friendly satellite or airborne vehicle, which could itself generate a cw laser beam $B_L$ (not shown), and direct the beam to the station S. The distance d between positions $P_1$ and $P_2$ would be less than the beam-width of beam $B_L$, and so beam $B_L$ would be received at positions $P_1$ and $P_2$ as signals $S_1$ and $S_2$, respectively. The beam $B_1$ would be an inquiry beam, and would provide the target T with sufficient information so that it could transmit coherent monochromatic signals $S_1$ and $S_2$ directed to the station S in synchronization with a cw laser-generated beam $B_R$ produced at the station S.

Optical devices 90 and 100 are responsive to the respective reference beams $B_{R1}$ and $B_{R2}$ and to the respective signals $S_1$ and $S_2$ (received from the target T at discrete positions $P_1$ and $P_2$ on the station S, as shown in FIG. 1) for respectively producing interference pattern signals $S_{I1}$ and $S_{I2}$. Each of the received signals $S_1$ and $S_2$ has a Doppler shift as a function of the movement of target T relative to station S. Optical devices 90 and 100 are in fixed locations on substation S substantially positioned so as to intercept signals $S_1$ and $S_2$.

Figure 4:
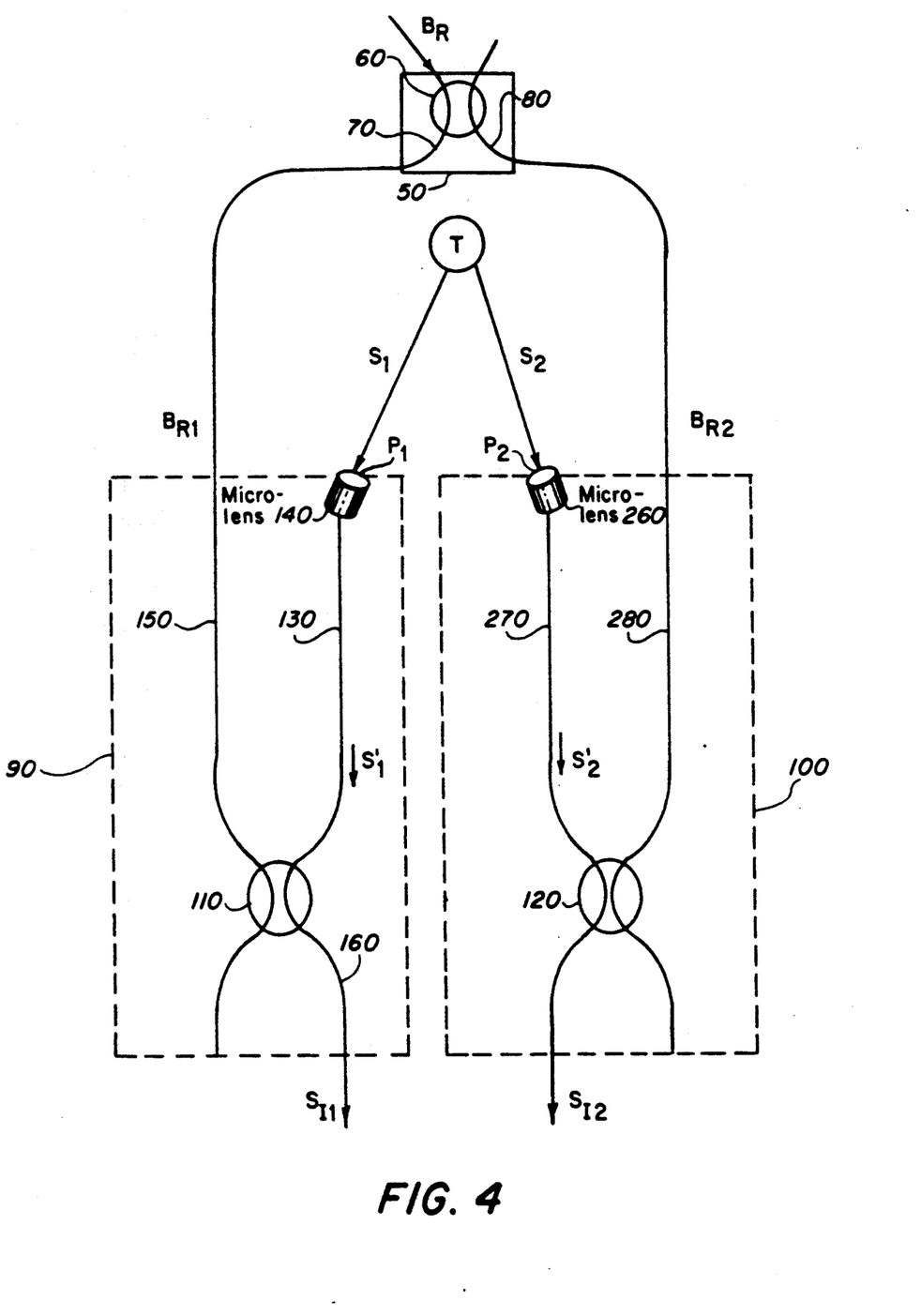
FIG. 4 illustrates the optical devices 90 and 100 of FIG. 2.

Referring now to FIG. 4, exemplary optical devices 90 and 100 are shown. Optical devices 90 and 100 include fiber optic couplers 110 and 120. Since the structure and operation of the optical device 90 are similar to those of optical device 100, only the optical device 90 will be discussed.

Signal $S_1$ received from the target T at position $P_1$ (FIG. 1) is applied to an arm 130 of the fiber optic coupler 110. It is preferable that a microlens or other suitable collecting lens 140 be disposed on the station S at position $P_1$ to focus the signal $S_1$ into the core (not shown) of arm 130.

The reference beam $B_{R1}$ from fiber optic coupler 60 is propagated through output fiber 70 into an arm 150 of the fiber optic coupler 110.

In response to the signal $S_1$ and the reference beam $B_{R1}$, the fiber optic coupler 110 produces an optical interference pattern signal $S_{I1}$ in an output arm 160 which combines the signals in input arms 130 and 150 so that the electromagnetic field in the optical interference pattern signal $S_{I1}$ is proportional to a combination of the electromagnetic fields in the signal $S_1$ received at position $P_1$ and in reference beam $B_{R1}$.

The above description of the structure and operation of the optical device 90 shown in FIG. 4 applies equally well to the structure and operation of the optical device 100 shown in FIG. 4 except that the optical device 100 is responsive to the received signal $S_2$ and is responsive to the reference beam $B_{R2}$ to produce an interference pattern signal $S_{I2}$ by using the fiber optic coupler 120.

Referring back to FIG. 2, as explained further below, an electrical processing circuit 170 responsive to the interference pattern signals $S_{I1}$ and $S_{I2}$ develops an angular signal S velocity indicative of the angular velocity $d\theta/dt$ of the target T. The electrical processing circuit 170 need not be in a fixed position with respect to station S.

Although not absolutely required for the operation of the system 10 of FIG. 2, the electrical processing circuit 170 can be responsive to a signal $S_D$ indicative of the distance R of the target T from the station S. A person skilled in the art can readily develop such a distance signal $S_D$, such as by utilizing radar equipment (not shown) in the base station S to develop the distance signal $S_D$. The electrical processing circuit 170 produces a transverse velocity signal $S_r$ indicative of the transverse velocity $v_t$ of the target T. Since the angular velocity signal $S_A$ is indicative of the angular velocity $d\theta/dt$ and since, as explained earlier, $d\theta/dt \approx v_t/R$, the transverse velocity signal $S_T$ is readily determined from an angular velocity signal $S_A$ and a distance signal $S_D$.

Although not absolutely required for the operation of the system 10 of FIG. 2, the electrical processing circuit 170 can be designed, as explained further below, to be responsive to the interference pattern signals $S_{I1}$ and $S_{I2}$ and to produce a signal $S_R$ indicative of radial velocity $v_r$ of the target T.

A system 10 of FIG. 2 according to the present invention could produce any or all of the output signals discussed above: angular velocity signal $S_A$, transverse velocity signal $S_T$, and radial velocity signal $S_R$.

Figure 5:
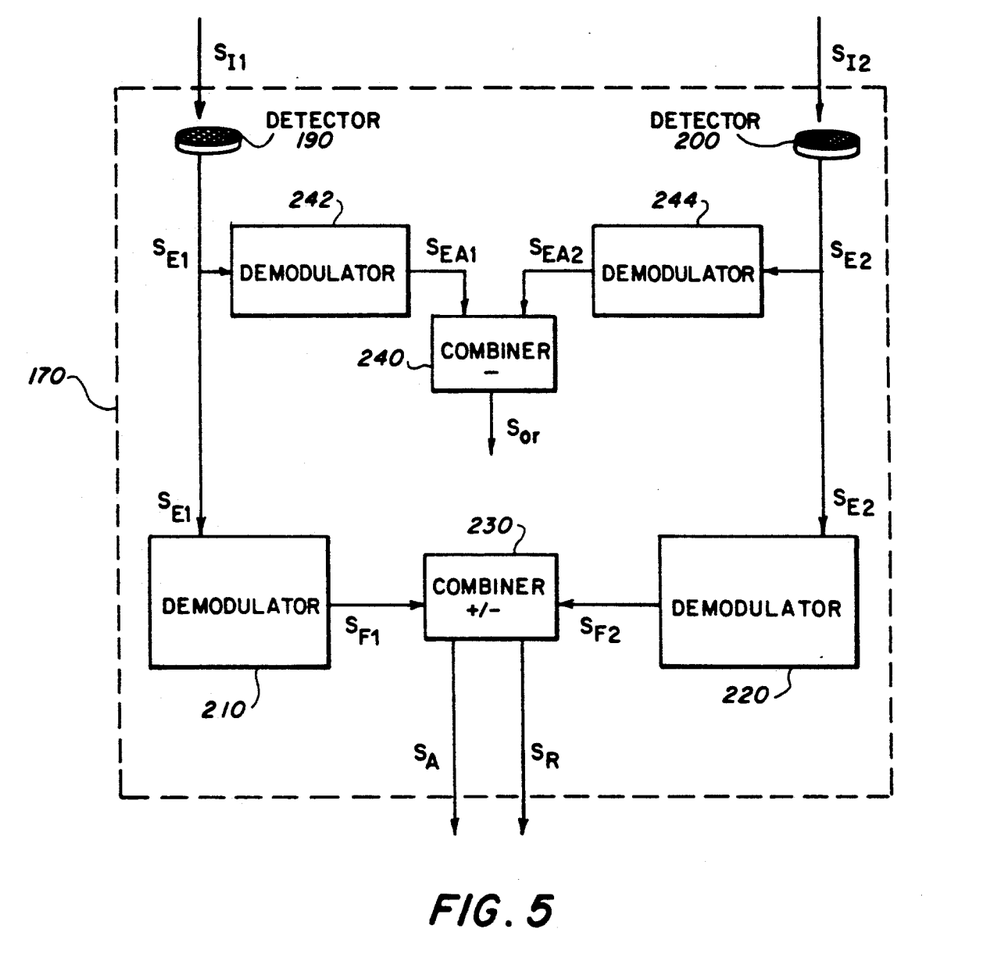
FIG. 5 illustrates the electrical processing circuit of FIG. 2.

Referring now to FIG. 5, an exemplary electrical processing circuit 170 is shown. It preferably includes photodetectors 190 and 200, which respectively convert the optical interference pattern signals $S_{I1}$ and $S_{I2}$ into electrical signals $S_{E1}$ and $S_{E2}$. The electrical signals $S_{E1}$ and $S_{E2}$ have frequency spectra, which correspond, respectively to $f_1$ and $f_2$ in equations (4a) and (4b). As previously discussed and shown in FIGS. 4 and 5, the interference pattern signals $S_{I1}$ and $S_{I2}$ are preferably produced at the outputs of the fiber optic couplers 110 and 120. Photodetectors 190 and 200 are preferably semiconductor photodiodes, which are square law detectors. Each of the semiconductor photodetectors 190 and 200 produces an electric current proportional to the total electric field multiplied by its complex conjugate. Semiconductor photodetectors 190 and 200 thereby mix the received signals $S_1$ and $S_2$ with the reference beams $B_{R1}$ and $B_{R2}$. Semiconductor photodetectors 190 and 200 typically have an inherent bandpass and are responsive to signals whose frequencies are within that bandpass.

It is standard, although optional, to provide amplifiers (not shown) and bandpass filter (not shown) to amplify the electrical signals $S_{E1}$ and $S_{E2}$ and filter them further so as to remove extraneous noise.

As shown in FIG. 5, the electrical processing circuit 170 preferably includes demodulators 210 and 220 which convert the electrical signals $S_{E1}$ and $S_{E2}$ to frequency signals $S_{F1}$ and $S_{F2}$ whose amplitude is dependent on the frequency spectra of electrical signals $S_{E1}$ and $S_{E2}$, respectively. Demodulators 210 and 220 can measure frequency deviation from a preset frequency, as is done, for example, by Hewlett Packard 8901B modulation analyzers. As shown in FIG. 5, a combiner 230 then combines the frequency signals $S_{F1}$ and $S_{F2}$ so as to produce radial velocity signal $S_R$ or angular velocity signal $S_A$. Since frequency signals $S_{F1}$ and $S_{F2}$ are proportional to the frequencies $f_1$ and $F_2$, respectively, adding or subtracting them by means known in the art, such as with a summer circuit or a difference circuit, will produce signals proportional to the radial velocity $v_r$ or to the angular velocity $v_t$, as shown in equations (4a) and (4b).

Referring back to FIGS. 1 and 2, as stated before, other than having optical devices 90 and 100 be in fixed positions on the station S, the invention does not have any positional requirement. Thus, the beam producer 15 and the electrical processing circuit 170 do not have to be in any particular or even fixed position. For example, the system 10 of FIG. 2 could be effectively practiced by transmitting beam $B_1$ from a different fixed or moving position than the origin OR, as with a remote or mobile transmitter. Of course, equations (1a)–(4b) would have to be modified to account for such differing positions.

As discussed earlier and shown in FIG. 3, it is optional to provide a frequency shifter 45 for shifting the frequency of reference beam $B_R$. The amount of this frequency shift might be adjusted to maximize sensitivity to movement of the target T based on the frequency characteristics of other parts of the system 10, on the frequency of beam $B_1$ and reference beam $B_R$, and on the range of anticipated Doppler shifts. For example, frequency shifter 45 could offset the frequency of reference beam $B_R$ so as to bring interference pattern signals $S_{I1}$ and $S_{I2}$ within the detection bandwidth of photodetectors 190 and 200 shown in FIG. 5. As a further example, the frequency shift could be the preset frequency for demodulators 210 and 220 shown in FIG. 5.

Referring now to FIG. 5, the system 10 of FIG. 2 may also have an angular tracking mechanism. Optical devices 90 and 100 (see FIGS. 2 and 4) have an angular orientation $\beta$ (not shown) with respect to target T. The angular tracking mechanism produces an orientation signal $S_{or}$ dependent on that angular orientation $\beta$. An adjustor (not shown) responsive to the orientation signal $S_{or}$ then modifies the angular orientation $\beta$, such as by using servos (not shown) to move positions $P_1$ and $P_2$ (see FIGS. 2, 4) with respect to target T. It is understood that positions $P_1$ and $P_2$ are stationary with respect to station S and are movable with respect to target T. By so tracking the target T, it can be kept within the field of view of the optical devices 90 and 100, (see FIGS. 2,4) and the angular orientation $\beta$ can be maintained so as to maximize sensitivity to the motion of target T. Referring briefly to FIG. 1, angular orientation $\beta$ is preferably angular position $\theta$: the angle a line from the origin OR to the target T makes with respect to the normal to the x-axis of station S.

Figure 6:
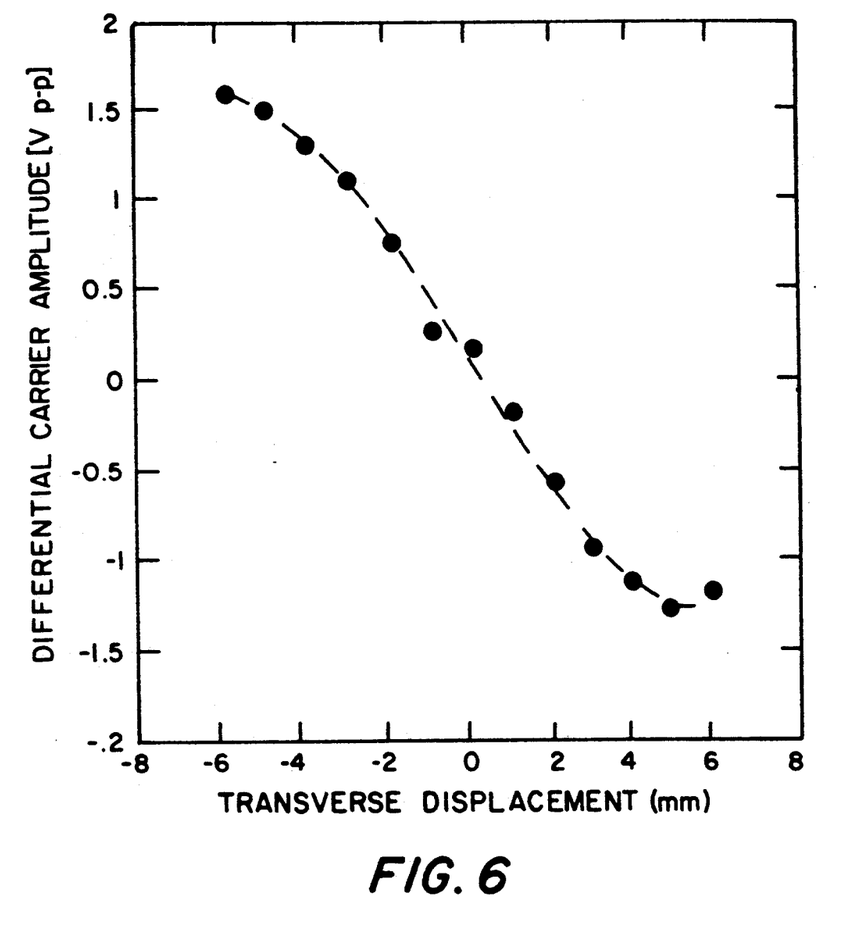
FIG. 6 is a plot of the amplitude of orientation signal $S_{or}$ of FIG. 5 with respect to displacement of the target T.

Referring now to FIGS. 4 and 5, an example of the angular tracking mechanism will now be discussed. Signals $S_1$ and $S_2$, received at positions $P_1$ and $P_2$, are typically of equal intensity when angular orientation $\theta$ (see FIG. 1) is 0°. In the configuration shown in FIG. 1, where $\theta > 0°$, the collection efficiency of the collection lens 140 (FIG. 4) is greater than the collection efficiency of the collection lens 260. The intensity of light $S_1'$ in input fiber 130 will be greater than the intensity of light $S_2'$ in input fiber 270. Similarly, for $\theta < 0°$, the collection efficiency of the collection lens 140 is less than the collection efficiency of the collection lens 260. The intensity of light $S_1'$ in input fiber 130 will be less than the intensity of light $S_2'$ in input fiber 270. The amplitudes of electrical signals $S_{E1}$ and $S_{E2}$ are typically dependent on the intensity of the signals $S_1'$ and $S_2'$, respectively. Signals $S_{E1}$ and $S_{E2}$ are typically sinusoidal, since they are the result of heterodyning received signals $S_1$ and $S_2$ with reference beams $B_{R1}$ and $B_{R2}$, respectively. Demodulators 242 and 246, responsive to electrical signals $S_{E1}$ and $S_{E2}$, respectively, produce signals $S_{EA1}$ and $S_{EA2}$ proportional to the amplitudes of signals $S_{E1}$ and $S_{E2}$, respectively. Combiner 240, responsive to signals $S_{EA1}$ and $S_{EA2}$, produces an orientation signal $S_{or}$ proportional to the difference between the amplitudes of signals $S_{EA1}$ and $S_{EA2}$, and therefore, indicative of the angular orientation $\beta$. FIG. 6 shows the plot of such an orientation signal $S_{or}$ with respect to the lateral displacement of the target T according to the example discussed further below.

The orientation signal $S_{or}$ could also be determined by comparing the interference pattern signals $S_{I1}$ and $S_{I2}$ or any other signals dependent on the intensity of received signals $S_1$ and $S_2$. For example, if system 10 of FIG. 2 were used without reference beams $B_{R1}$ and $B_{R2}$, then signals $S_{E1}$ and $S_{E2}$ would be homodyned signals and therefore not sinusoidal. Combiner 240 could directly compare the signals $S_{E1}$ and $S_{E2}$, and demodulators 242 and 244 would not be needed.

Figure 7:
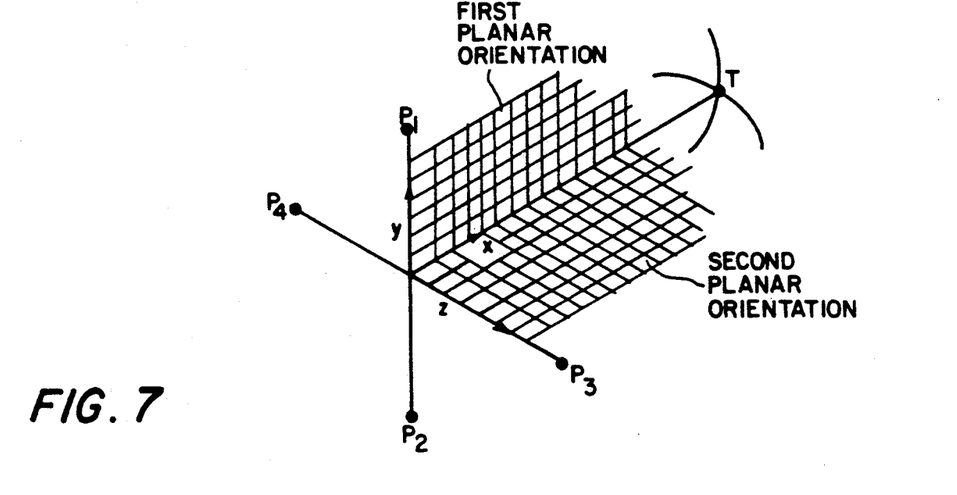
FIG. 7 shows the operation of the invention for tracking the 3-dimensional movement of a target T.

Referring now to FIG. 7, the system 10 shown in FIG. 2 and described above provides measurement in an x-y plane (see FIG. 1) referred to as a first planar orientation. The use of an additional and duplicate system 10' (not shown) in a second planar orientation which is not parallel to the first planar orientation, permits measurement of the spherical movement of the target T. For example, the z-x plane could be a second planar orientation. In other words, a system 10 (not shown) would have both system 10 shown in FIG. 2 and system 10'.

Such a system 10 for measuring the spherical movement of target T is as described above for system 10, except that the beam producer 15 transmits the beam $B_1$ to the target T and enables the target T to generate the signals $S_1$ and $S_2$ having a first planar orientation (in the x-y plane as shown in FIGS. 1 and 7) and further enables the target T to generate signals $S_3$ and $S_4$ (not shown) having a second planar orientation (in the z-x plane as shown in FIG. 7), the signals $S_3$ and $S_4$ each having Doppler shifts as a function of the movement of T. The beam producer 15 further produces reference beams $B_{R3}$ and $B_{R4}$.

The system 10* for measuring the spherical movement of the target T further includes optical devices 90' and 100' (not shown) responsive to the reference beams $B_{R3}$ and $B_{R4}$ and to the signals $S_3$ and $S_4$ received from the target T respectively at discrete positions $P_3$ and $P_4$ (not shown) on the station S, the optical devices 90' and 100' respectively producing interference pattern signals $S_{I3}$ and $S_{I4}$ (not shown).

The angular velocity signal $S_A$ produced by the electrical processing circuit 170 of system 10 in FIG. 2 is indicative of the target's angular velocity $d\theta/dt$ in the first planar orientation—that is, that component of the target's angular velocity in the first planar orientation, preferably the x-y plane. The system 10* for measuring the spherical movement of the target T further includes an electrical processing circuit 170' (not shown) responsive to the interference pattern signals $S_{I3}$ and $S_{I4}$ for developing a signal $S_A'$ indicative of the target's angular velocity $d\theta'/dt$ in the second planar orientation—that is, that component of the target's angular velocity in the second planar orientation, such as the z-x plane.

Having described the invention in general, the following example is given as a particular embodiment thereof and to demonstrate the practice and advantages thereof. It is understood this example is given by way of illustration and is not intended to limit the specification or the claims to follow in any manner.

EXAMPLE

This example demonstrates measurement of radial and angular velocities $v_r$ and $d\theta/dt$ of a simulated target T. The system 10 of FIG. 2 as used in this example is a dual aperture heterodyne interferometer that employs pigtailed graded index microlenses (see FIG. 4) as the detection apertures and uses single mode optical fibers (not shown).

Figure 8:
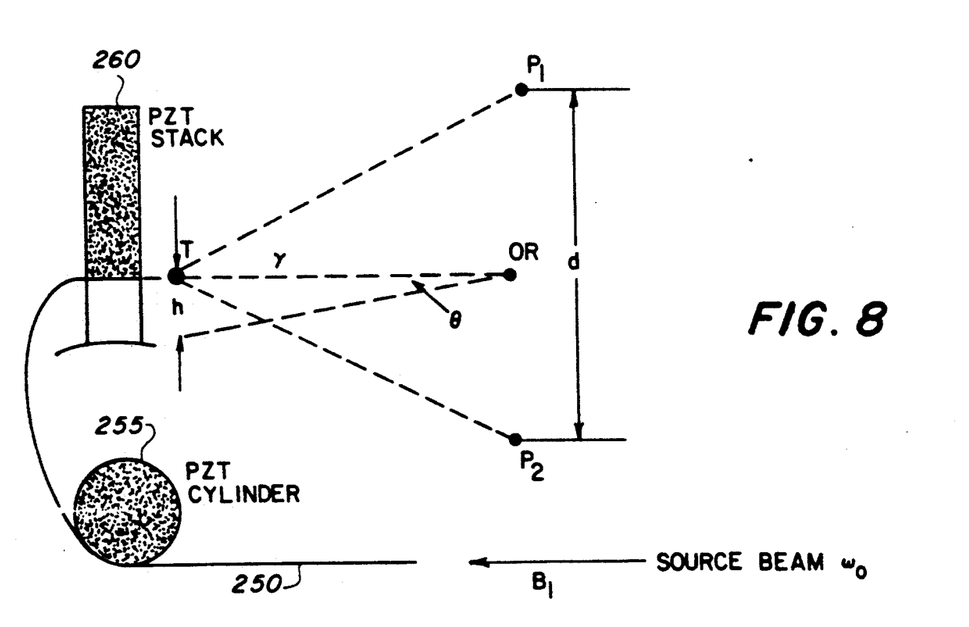
FIG. 8 shows an arrangement for simulating a moving target and measuring its movement according to the embodiment of FIG. 2.

Referring now to FIG. 8, the experimental arrangement for simulating the target T is shown. A 40 milliwatt (mW) cw, 1.06 μm, diode pumped, single frequency Nd:YAG laser 30 (see FIG. 3) is used as the primary light source. Approximately 3.6 mW of the laser light at angular frequency $\omega_0$ is injected into a source fiber 250. Several turns of this fiber 250 are wrapped around a piezoelectric cylinder 255 and the end of the fiber is mounted to a piezoelectric stack 260. The cleaved endface of the fiber acts as a simulator of a source or target T. An oscillating voltage at $\Omega_r/2\pi = 40$ Hz is applied to the piezoelectric cylinder 255 which generates an oscillating phase shift in the radiated light, thereby simulating radial motion of source T having amplitude $\Delta R = 50*10^{-9}$ m. An oscillating voltage at $\Omega_t/2\pi = 5$ Hz is applied to the piezoelectric stack 260, thereby generating a transverse motion of source T having amplitude $h/2 = 0.25$ millimeters (mm). This arrangement provides a light radiation from a source executing transverse motion and simulating radial motion.

Referring to FIGS. 1 and 4, the light radiated from source T is collected by two microlenses 140 and 260 symmetrically located about the origin OR at positions $P_1$ and $P_2$ at a range R of 3.3 m from the source T and separated from each other by a distance d of 2 centimeters (cm). The microlenses 140 and 260 focus the light into the cores of the single mode fibers 130 and 270 which carry the light to couplers 110 and 120.

Referring now to FIG. 3, A local oscillator beam $B_R$ of approximately 100 microwatts is split from laser 30. Its frequency is shifted by two successive Bragg cells 45 to $\omega_0 + \Delta\omega$ where $\Delta\omega/2\pi = 280$ kHz. Referring now to FIG. 4, this local oscillator beam $B_R$ is divided by coupler 60 into reference beams $B_{R1}$ and $B_{R2}$ which are respectively combined with the collected light $S_1$ and $S_2$ at couplers 110 and 120. $LP_{11}$ mode strippers (not shown), consisting of loops of fiber of about 1 cm in diameter, are utilized in each collection arm 150 and 280 of couplers 110 and 120 to insure that only the $LP_{01}$ spatial mode is accepted by the collection optics. A second cw laser (not shown), also lasing at 1.06 μm, provides an alignment beam which is injected into coupler C4 (not shown), thereby facilitating optical alignment and verifying the spatial mode purity.

Referring now to FIG. 5, the combined light beams are detected at the photodiodes 190 and 200 to produce electrical signals $S_{E1}$ and $S_{E2}$ with respective intensities:

$$V_1(t) = V_{10}(\theta) \cos [\Delta\omega t + \Phi_1(t)] \quad (5a)$$

$$V_2(t) = V_{20}(\theta) \cos [\Delta\omega t + \Phi_2(t)] \quad (5b)$$

where position angle $\theta$ is as discussed above and shown in FIG. 1, $V_{10}(\theta)$ and $V_{20}(\theta)$ are the position angle $\theta$ dependent carrier amplitudes for positions $P_1$ and $P_2$, respectively, $\Delta\omega$ is the frequency shift from the Bragg cells 45 as discussed earlier, and phases $\Phi_1$ and $\Phi_2$ are the phases of the carriers associated with the source fiber motion, as discussed earlier (see equations (1a) and (1b)). Equations (3a) and (3b) show the relationship between the sum $\Phi_+$ and difference $\Phi_-$ of the phase angles $\Phi_1$ and $\Phi_2$ with the radial velocity dR/dt and the angular velocity $d\theta/dt$.

The electrical signals $S_{E1}$ and $S_{E2}$ are demodulated by demodulators 210 and 220, such as Hewlett Packard 8901B modulation analyzers which utilize a phase-locked loop circuit, to measure the frequency deviation or phase rate and produce analog voltages $S_{F1}$ and $S_{F2}$ proportional to such frequency deviation or phase rate for signals $S_{E1}$ and $S_{E2}$, respectively. Analog voltages $S_{F1}$ and $S_{F2}$ from demodulators 210 and 220 are either added (or subtracted) by combiner 230 to yield a voltage proportional to the radial velocity: $V_+(t) = (\eta/2\pi) d(\Phi_+)/dt$ (or a voltage proportional to the angular velocity: $V_-(t) = (\eta/2\pi) \cdot d(\Phi_-)/dt$), where $V_+$ (not shown) is the sum of voltages $S_{F2}$ and $S_{F1}$, $V_-$ (not shown) is the difference of voltages $S_{F2}$ and $S_{F1}$, and $\eta = 1.0$ millivolt/Hz is a frequency deviation to voltage conversion coefficient. $V_+$ is the voltage of radial signal $S_R$ and $V_-$ is the voltage of angular signal $S_A$.

Figure 9A:
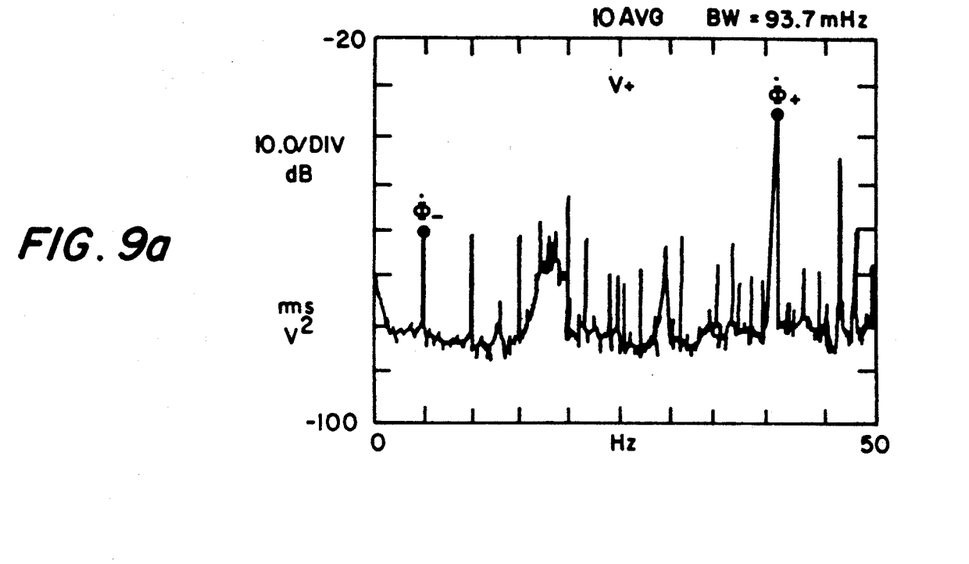
FIGS. 9a and 9b illustrate the output signals $S_R$ and $S_A$ of FIG. 2.
Figure 9B:
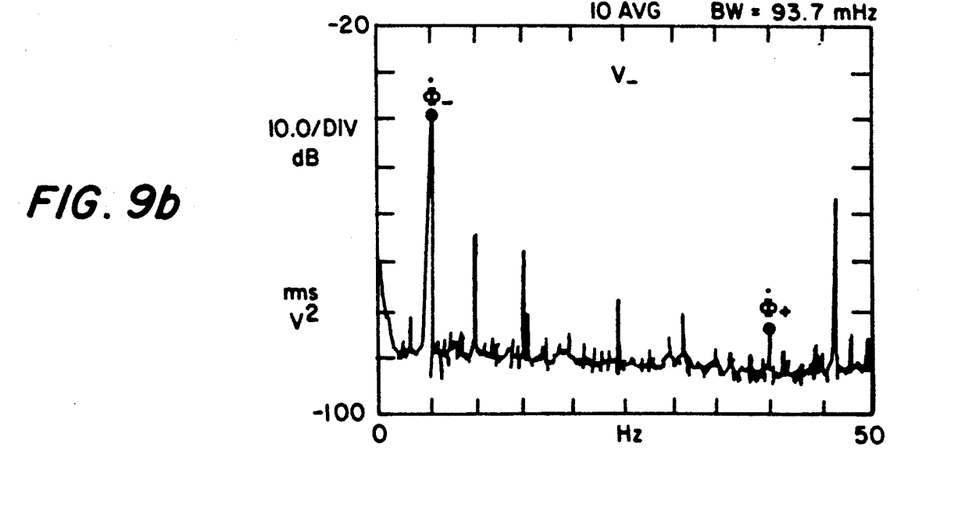

FIGS. 9a and 9b respectively show the sum and difference voltage power spectra $V_+$ and $V_-$ of the output $S_{F1}$ and $S_{F2}$ of the demodulators 210 and 220 (FIG. 5). The $V_+$ power spectrum demonstrates the radial velocity peak of $-35.9$ decibel volts rms (DBV) at 40 Hz while the angular velocity peak at 5 Hz, is suppressed at $-59.5$ dBV rms. The $V_-$ power spectrum exhibits a prominent peak $-39.3$ dBV rms at 5 Hz, corresponding to the angular velocity, and a suppressed peak of $-83.2$ dBV rms at 40 Hz for the radial velocity. It can be seen that the angular and radial velocities exhibit suppressions of 20.2 decibels (dB) and 47.3 dB in the sum and difference voltage power spectra, respectively. These rms voltages are in good agreement with the expected voltages given by $[V_+]_{rms} = \eta\Delta R\Omega_r/\lambda_0 = -39$ dBV rms and $[V_-]_{rms} = \eta h \cdot d \cdot \Omega_t/(2\lambda_0 R) = -33$ dBV rms. The discrepancy of 6 dB between the measured and calculated values for $[V_-]_{rms}$ is attributed to the critical alignment required for the transverse measurement. Note that the $V_-$ power spectrum suppresses noise common to both optical receivers.

The microlens images the remote target T onto the endfaces of the optical fibers 130 and 270 (FIG. 4). This image (not shown) has an approximate Gaussian spatial distribution. The fundamental modes of the fibers 130 and 270 are also Gaussian, being determined by the relevant fiber properties. Therefore, the analysis of the angle-dependent coupling efficiency $T(\theta)$ of optical power into the fiber core is similar to that of the coupling efficiency between two parallel and displaced single mode fibers. Adaption of this latter analysis to the pigtailed microlens yields the following expression for the coupling efficiency:

$$T(\gamma) = A \cdot e^{-(\frac{\gamma}{\psi})^2} \quad (6)$$

where A is a constant, $\gamma \approx d/2R$ is the tilt angle between the optic axes of the source fiber 250 and the receiving optics as shown in FIG. 8, and $\psi$ is the angular resolution of the pigtailed microlens, found to be approximately 1.0 milliradians.

As shown in FIG. 5, an orientation signal $S_{or}$ indicative of the orientation angle $\theta$ may be generated by subtracting the amplitudes of the electrical signals $S_{E1}$ and $S_{E2}$. Since each amplitude of electrical signals $S_{E1}$ and $S_{E2}$ is proportional to $\sqrt{T}$, the orientation signal $S_{or}$ is given by:

$$f(\theta) = \sqrt{A} \cdot [e^{-\frac{(\theta+\gamma)^2}{2\psi^2}} - e^{-\frac{(\theta+\gamma)^2}{2\psi^2}}] \quad (7)$$

A Taylor series expansion about $\theta$ demonstrates the linear portion of the orientation signal as $$f(\theta) = 2\theta \sqrt{A} \cdot \left(\frac{\gamma}{\psi^2}\right) \cdot e^{-\frac{\gamma^2}{2\psi^2}}. \quad (8)$$

As discussed earlier and shown in FIG. 5, demodulators 242 and 244 and combiner 240 produce an orientation signal $S_{or}$. Hewlett Packard 8901B modulation analyzers can be used as demodulators 242 and 244. FIG. 6 is a plot of the amplitude of $S_{or}$ as a function of source T transverse displacement h. The broken line is a non-linear least squares fit of the data to a third order polynomial trial function. The fitting parameters indicate orientation signal sensitivities of 0.36 Volts (V)/mm for the displacement and 1.2 V/milliradians for the angular displacement.

It is understood that many other changes and additional modifications of the invention are possible in view of the teachings herein without departing from the scope of the invention as defined in the appended claims.

What is claimed is:

1. A system for determining the velocity of a mobile target relative to a station, said system comprising:
   (a) first means for producing first and second reference beams and for transmitting a first beam to the target to enable the target to generate first and second signals;
   (b) first and second optical means disposed respectively at first and second positions on the station, being responsive respectively to said first and second reference beams and respectively to said first and second signals received from the target respectively at said first and second positions for respectively producing first and second interference pattern signals, said received first and second signals containing Doppler shifts as a function of movement of the target with respect to the station; and
   (c) developing means responsive to said first and second interference pattern signals for developing at least one signal selected from the group consisting of a signal indicative of the target's angular velocity and a signal indicative of the target's radial velocity.

2. The system according to claim 1 wherein said first means comprises:
   (a) means for generating a reference beam; and
   (b) second means responsive to said reference beam for producing said first and second reference beams.

3. The system according to claim 2 wherein:
   (a) said generating means comprises a cw laser for producing a coherent monochromatic beam; and
   (b) said second means comprises a beam splitter responsive to said coherent monochromatic beam for producing said first and said second reference beams.

4. The system according to claim 2 wherein said second means comprises a fiber optic coupler responsive to said reference beam for producing said first and second reference beams.

5. The system according to claim 3 further comprising means coupled between said generating means and said second means for frequency shifting said reference beam by a preselected amount.

6. The system according to claim 1 wherein said first and second optical means respectively comprise first and second fiber optic couplers.

7. The system according to claim 6 wherein said first and second optical means respectively include first and second collection lens means for focussing said first and second signals respectively received from the target as input to said first and second fiber optic couplers.

8. The system according to claim 1:
   (a) wherein said first means further comprises:
      i. means for transmitting a first beam to the target to enable the target to generate third and fourth signals; and
      ii. means for producing a third reference beam and a fourth reference beam; and
   (b) further comprising wherein said system further comprises:
      i. third and fourth optical means disposed respectively at third and fourth positions on the station, being responsive respectively to said third and fourth reference beams and respectively to said third and fourth signals received from the target respectively at said third and fourth positions for respectively producing third and fourth interference pattern signals, said received third and fourth signals containing Doppler shifts as a function of movement of the target with respect to the station; and
      ii. third means responsive to said third and fourth interference pattern signals for developing a signal indicative of the target's angular velocity having said second planar orientation.

9. The system according to claim 1 wherein said developing means comprises:
   first and second photodetector means respectively for converting said first and second interference pattern signals respectively to first and second electrical signals respectively having first and second frequency spectra.

10. The system according to claim 9 wherein said developing means further comprises
   (a) first and second frequency means respectively responsive to said first and second electrical signals for producing first and second frequency signals having first and second amplitudes dependent on the first and second frequency spectra; and
   (b) third frequency means responsive to said first and second frequency signals for developing at least one signal selected from the group consisting of a signal indicative of the target's angular velocity and a signal indicative of the target's radial velocity.

11. The system according to claim 1 wherein said developing means comprises means responsive to said first and second interference pattern signals and to a signal indicative of the distance of the target from the station for developing a signal indicative of the target's transverse velocity.

12. The system according to claim 1 wherein said first and second optical means have an angular orientation with respect to the target and said system further comprises:
   (a) means for producing an orientation signal dependent on said angular orientation; and
   (b) tracking means responsive to said orientation signal for modifying said angular orientation.

* * * * *